(12) United States Patent
Nammi et al.

(10) Patent No.: US 9,674,002 B2
(45) Date of Patent: Jun. 6, 2017

(54) CHANNEL ESTIMATION IN A MULTI-ANTENNA WIRELESS COMMUNICATIONS SYSTEM

(71) Applicant: Telefonaktiebolaget L M Ericsson (publ), Stockholm (SE)

(72) Inventors: Sairamesh Nammi, Kista (SE); Stefania Sesia, Roquefort les Pins (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 133 days.

(21) Appl. No.: 14/432,830

(22) PCT Filed: Sep. 5, 2013

(86) PCT No.: PCT/SE2013/051037
§ 371 (c)(1),
(2) Date: Apr. 1, 2015

(87) PCT Pub. No.: WO2014/058375
PCT Pub. Date: Apr. 17, 2014

(65) Prior Publication Data
US 2015/0249553 A1    Sep. 3, 2015

Related U.S. Application Data

(60) Provisional application No. 61/711,253, filed on Oct. 9, 2012.

(51) Int. Cl.
*G01R 31/08* (2006.01)
*G06F 11/00* (2006.01)
(Continued)

(52) U.S. Cl.
CPC ............ *H04L 25/0202* (2013.01); *H04B 7/04* (2013.01); *H04B 7/063* (2013.01); *H04B 7/0632* (2013.01);
(Continued)

(58) Field of Classification Search
CPC .............. H04L 25/0202; H04L 5/0048; H04L 25/0204; H04L 25/0228; H04L 25/0258;
(Continued)

(56) References Cited

U.S. PATENT DOCUMENTS

2013/0150104 A1* 6/2013 Clevorn .............. H04L 25/0228
455/501
2013/0308553 A1* 11/2013 Cozzo ................... H04L 1/0027
370/329

FOREIGN PATENT DOCUMENTS

| CN | 102655486 A | 9/2012 |
|---|---|---|
| WO | WO 2013/115708 | 8/2013 |
| WO | WO 2013/169201 | 11/2013 |

OTHER PUBLICATIONS

RP-111393, "New WI: Four Branch MIMO transmission for HSDPA", Ericsson, 2011.
(Continued)

*Primary Examiner* — Lonnie Sweet
(74) *Attorney, Agent, or Firm* — Baker Botts, LLP

(57) ABSTRACT

A method performed by a first device for estimating a radio channel between the first device and a second device in a telecommunications system is provided. The first device receives common pilot signals and demodulation signals over the radio channel in transmissions from the second device. Then, the first device estimates the radio channel based on the common pilot signals and the demodulation pilot signals and determines the radio channel based on the common pilot signals and the demodulation pilot signals. A first device for estimating a radio channel between the first device and a second device in a telecommunications system is also described.

16 Claims, 11 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 25/02* (2006.01)
*H04B 7/06* (2006.01)
*H04B 7/04* (2017.01)
*H04L 5/00* (2006.01)
*H04L 25/03* (2006.01)

(52) U.S. Cl.
CPC ......... *H04B 7/0639* (2013.01); *H04L 5/0048* (2013.01); *H04L 25/0204* (2013.01); *H04L 25/0228* (2013.01); *H04L 25/0258* (2013.01); *H04L 25/03898* (2013.01)

(58) Field of Classification Search
CPC ..... H04L 25/03898; H04B 7/04; H04B 7/063; H04B 7/0639
See application file for complete search history.

(56) References Cited

OTHER PUBLICATIONS

R1-111763, 4-branch MIMO for HSDPA, Ericsson, 2011.
R1-120352, Common Pilot Design for Four branch MIMO System, Ericsson, 2012.
PCT Written Opinion of the International Searching Authority for International application No. PCT/SE2013/051037, Apr. 2, 2014.

\* cited by examiner

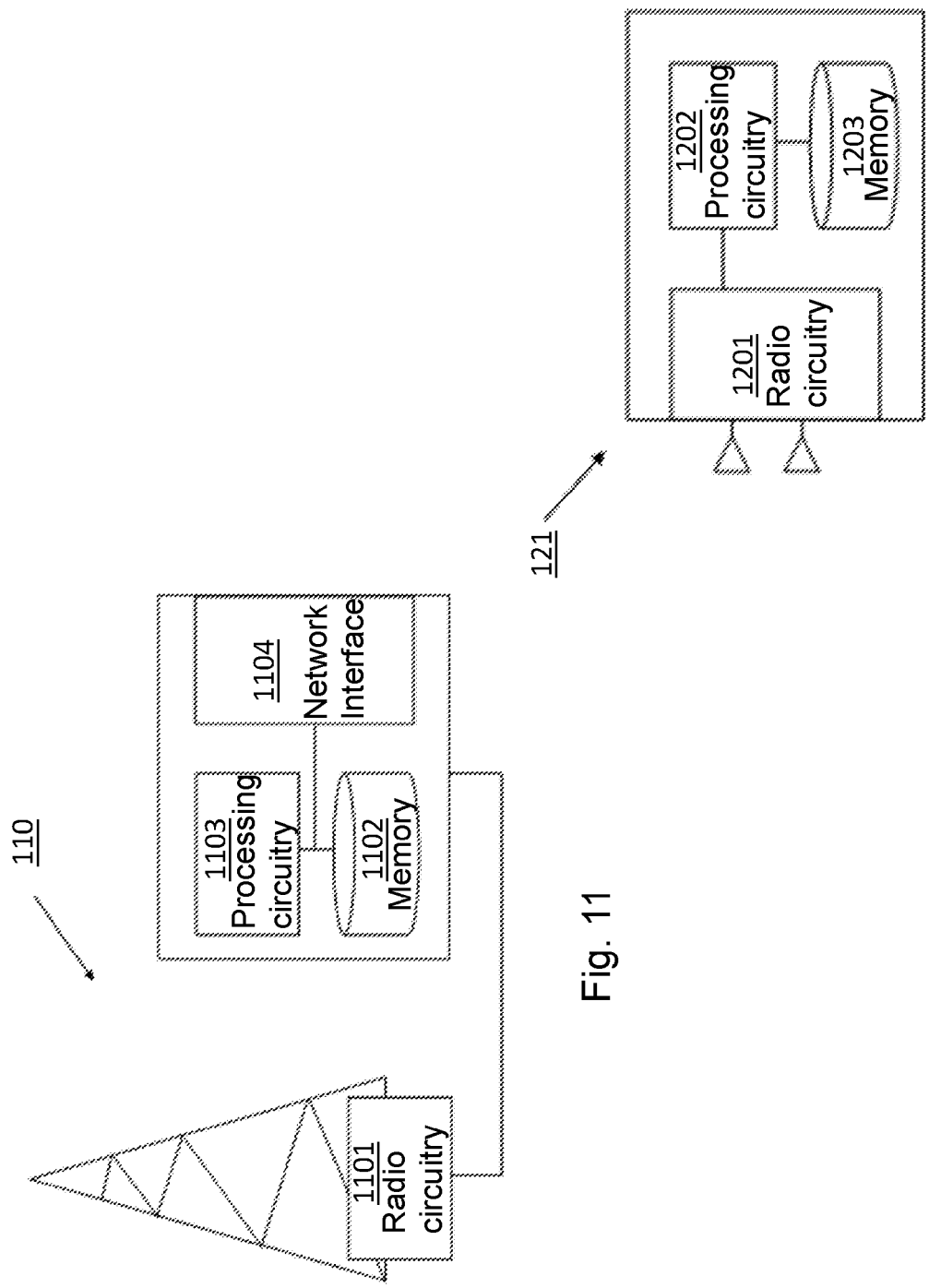

CHANNEL ESTIMATION IN A MULTI-ANTENNA WIRELESS COMMUNICATIONS SYSTEM

PRIORITY

This nonprovisional application is a U.S. National Stage Filing under 35 U.S.C. §371 of International Patent Application Serial No. PCT/SE2013/051037, filed Sep. 5, 2013, and entitled "Channel Estimation In A Multi-Antenna Wireless Communications System" which claims priority to U.S. Provisional Patent Application No. 61/711,253 filed Oct. 9, 2012, both of which are hereby incorporated by reference in their entirety.

TECHNICAL FIELD

Embodiments herein relate to channel estimation in a multi-antenna wireless communications system. In particular, embodiments herein relate to a network node, a user equipment, UE, and methods therein for channel estimation in a multi-antenna wireless communications system.

BACKGROUND

In a typical cellular network, also referred to as a wireless communication system, User equipment, UEs, communicate via a Radio Access Network, RAN, to one or more core networks, CNs.

A user equipment is a mobile terminal by which a subscriber may access services offered by an operator's core network and services outside operator's network to which the operator's RAN and CN provide access. The user equipment may be for example communication devices such as mobile telephones, cellular telephones, smart phones, tablet computers or laptops with wireless capability. The user equipment may be portable, pocket-storable, hand-held, computer-comprised, or vehicle-mounted mobile devices, enabled to communicate voice and/or data, via the radio access network, with another entity, such as another mobile station or a server.

User equipment are enabled to communicate wirelessly in the cellular network. The communication may be performed e.g. between two user equipment, between a user equipment and a regular telephone and/or between the user equipment and a server via the radio access network and possibly one or more core networks, comprised within the cellular network.

The radio access network covers a geographical area which is divided into cell areas, with each cell area being served by a base station, e.g. a Radio Base Station, RBS, which in some radio access networks is also called eNodeB (eNB), NodeB, B node or network node. A cell is a geographical area where radio coverage is provided by the radio base station at a base station site. Each cell is identified by an identity within the local radio area, which is broadcast in the cell. The base stations communicate over the air interface operating on radio frequencies with the user equipment within range of the base stations.

Multiple Input Multiple Output, MIMO, refers to any communications system with multiple antennas at the transmitter and receiver, and it is used to improve communication performance. The terms input and output refer to the radio channel carrying the signal, not to the devices having antennas. At the transmitter, Tx, multiple antennas may be used to mitigate the effects of fading via transmit diversity and to increase throughput via spatial division multiple access. At the receiver, Rx, multiple antennas may be used for receiver combining which provides diversity and combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the minimum number of receiver antennas required is equal to the number of separate data streams. 4×4 MIMO, also referred to as four branch MIMO, may support up to four data streams.

Several new features are added for the long term HSPA evolution in order to meet the requirements set by the International Mobile Telecommunications-Advanced, IMT-A. The main objective of these new features is to increase the average spectral efficiency. One possible technique for improving downlink spectral efficiency would be to introduce support for four branch MIMO, i.e. utilize up to four transmit and receive antennas to enhance the spatial multiplexing gains and to offer improved beamforming capabilities. Four branch MIMO provides up to 84 Mbps per 5 MHz carrier for high Signal to Noise Ratio, SNR, user equipment and improves the coverage for low SNR user equipment.

Channel feedback information enables a scheduler to decide which user equipment should be served in parallel. The user equipment is configured to send three types of channel feedback information: CQI, RI and PMI.

CQI is an important part of channel information feedback. The CQI provides the base station with information about link adaptation parameters which the user equipment supports at the time. The CQI is utilized to determine the coding rate and modulation alphabet, as well as the number of spatially multiplexed data streams.

RI is the user equipment recommendation for the number of layers, i.e. streams to be used in spatial multiplexing. RI is only reported when the user equipment operates in MIMO mode with spatial multiplexing. The RI may have the values 1 or 2 in a 2×2 MIMO configuration and it may have the values from 1 and up to 4 in a 4×4 MIMO configuration. The RI is associated with a CQI report. This means that the CQI is calculated assuming a particular RI value. The RI typically varies more slowly than the CQI.

PMI provides information about a preferred pre-coding matrix in a codebook based pre-coding. PMI is only reported when the user equipment operates in MIMO. The number of pre-coding matrices in the codebook is dependent on the number of antenna ports on the base station. For example, four antenna ports enables up to 64 matrices dependent on the RI and the UE capability. A Precoding Control Indicator, PCI, indicates a specific pre-coding vector that is applied to the transmit signal at the base station.

The Multiple Input Multiple Output, MIMO, is an advanced antenna technique to improve the spectral efficiency and thereby boosting the overall system capacity. The MIMO technique may use a commonly known notation (M×N) to represent MIMO configuration in terms number of transmit (M) and receive antennas (N). The common MIMO configurations used or currently discussed for various technologies are: (2×1), (1×2), (2×2), (4×2), (8×2) and (8×4). The configurations represented by (2×1) and (1×2) are special cases of MIMO and they correspond to transmit diversity and receiver diversity, respectively. The configuration (2×2) is used in and supported by WCDMA release 7, and the configurations ((4×4), (4×2), (4×1)) are being defined in WCDMA release 11.

A 4Tx transmissions scheme for HSDPA is currently discussed within 3GPP standardization, while previous versions of the specification supports up to 2Tx antenna transmissions. In order to support 4Tx MIMO transmissions, it is necessary to obtain 4 channel estimates in order to characterize each of the spatial layers, which means that more pilot signals will be necessary. Common pilot signals are used for two main functionalities: Channel State Information, CSI, estimation through channel sounding whereby RI, CQI and PCI may be estimated, and channel estimation for data demodulation purposes.

For a 4-branch MIMO, two different approaches may be used: common pilot signals for both CSI and channel estimation for data demodulation; and common pilot signals for CSI estimation and additional high power pilot signals for channel estimation for data demodulation. In the above context, "common pilots" or "common pilot signals" refer to pilot signals that are made available to all user equipments and which are transmitted without user specific beamforming.

Common pilot signals, or common pilots, may be transmitted at instances in which legacy user equipments, e.g. Release 7 MIMO and Release 99, who are not able to demodulate 4Tx transmissions are scheduled. These legacy user equipments cannot make use of the energy in the common pilot signals. However, the energy in the additional common pilot signals will reduce the amount of energy available for HS-PDSCH scheduling to the legacy user equipments.

Moreover, the additional pilot signals cause interference to these user equipments. Therefore, to minimize performance impacts to non-4Tx user equipments, it is essential that the power of the common pilot signals can be reduced to a low value.

Unfortunately with reduced pilot power of common pilot signals, the demodulation performance will be impacted. Hence, two additional pilot signals with higher power are introduced for data demodulation in a four branch MIMO system. These additional pilot signals are sometimes called scheduled pilot signals or demodulation common pilot signals. A base station may configure these additional pilot signals based on channel conditions and available power.

Hence, the pilot signal design schemes for 4-branch MIMO may be divided in to:
A. Common pilots for CSI estimation and data demodulation
B. Common pilots for CSI estimation and additional pilots for data demodulation A. Common Pilots for CSI Estimation and Data Demodulation FIG. 1 shows a schematic block diagram illustrating an example of a telecommunications system 150 with common pilots for CSI estimation and data demodulation. In other words, the figure shows a conceptual diagram of an example of a common pilot design system. Here, it is assumed that the transmitter Tx is assumed to be a transmitter of a network node and the receiver Rx a receiver of a user equipment.

As can be seen in FIG. 1, the network node transmitter, Tx 151, may transmit known pilot symbols, i.e. common pilots 153, e.g. CPICH, for channel estimation for channel sounding. When data is present, the data 154 is precoded, e.g. via precoder 155, and then transmitted together with the common pilots 153. The transmitted data 154 and common pilot signals 153 are received by the user equipment receiver, Rx 152.

The transmitted data 154 may be detected by the user equipment, e.g. via a data detector 156. The user equipment may also estimate channel quality, typically SINR, from the channel sounding, e.g. via a channel estimator 157. The user equipment may also compute the preferred precoding matrix and CQI for the next downlink transmission, e.g. via a pre-coder matrix calculator 158. This information may be conveyed to the network node through a feedback channel 159, e.g. HS-DPCCH.

The network node may process this information, i.e. the feedback information from the user equipment, and determine the precoding matrix, modulation, coding rate, and some other parameters, such as transport block size, etc. The network node may convey this information to the user equipment through a downlink control channel. The network node then transmits data with the modulation and coding rate indicated in the downlink control channel. The network node may pre-multiply the data by a precoding vector/matrix before passing the data to the antenna ports. The user equipment may estimate the channel for data demodulation from the common pilot symbols, which is shown in FIG. 1.

It should be noted that a solution based on common pilot signals only may have a negative impact on legacy user equipments unless the power on the additional pilot signals is minimal.

FIG. 2 shows a diagram illustrating system throughput with different pilot powers in a telecommunication system. In other words, the figure shows the performance of a pilot reduction scheme on the sector throughput with different number of user equipments per sector.

Here, it is assumed that all the user equipments are Release-7 MIMO capable with 2 receive antennas, 2Rx. The pilot signal powers for the first and the second antennas are set to −10 dB and −13 dB, respectively. The additional interference due to third ($3^{rd}$) and fourth ($4^{th}$) pilot signals is considered with different power levels of the pilot signals, i.e. at −25 dB (2a), −22 dB (2b), −19 dB (2c), −16 dB (2d), −13 dB (2e). These are compared to the 2×2 MIMO case with no interference (2), i.e. no interference by a third or fourth antenna.

Here, it may be observed that as the power of the additional pilot signals is decreased, the impact on the system throughput performance is less. For example, if the pilot signal power is around −19 dB (2c), the impact on the legacy user equipments may be considered almost negligible. However, if the pilot signal power is minimal, e.g. around −13 dB (2e), then the demodulation performance of 4Tx user equipments, i.e. non-legacy user equipments, will be adversely impacted.

FIG. 3-4 shows diagrams illustrating link level performance when common pilot signals are used for CSI estimation and data demodulation in a telecommunication system.

Common pilot signals may be transmitted at instances in which legacy UEs (Release 7 MIMO and Release 99) that are not able to demodulate 4Tx transmissions, are scheduled. These legacy UEs cannot make use of the energy in the $3^{rd}$ and $4^{th}$ common pilot signals. Also, the energy made available in the $3^{rd}$ and $4^{th}$ pilot signals reduces the amount of energy available for HS-PDSCH scheduling to the legacy UEs. Moreover, the $3^{rd}$ and $4^{th}$ common pilots may cause interference to these UEs which at best may make use of the $1^{st}$ and $2^{nd}$ common pilot signals. Therefore, to minimize performance impacts to non-4Tx UEs, it is desirable that the power of at least the 3rd and 4th common pilot signals be reduced to a low value.

A solution based only on common pilots will have a negative impact on the legacy UEs unless the powers on the 3rd and 4th common pilots are minimal. However, if the powers are minimal, then the demodulation performance of 4Tx UEs will be adversely impacted.

FIGS. 3 and 4 show example link level throughputs as a function of pilot powers on 3rd and 4th pilots for a non-legacy UE with three different geometries for 4×4 MIMO and 4×2 MIMO systems, respectively. In these figures, the pilot powers for the 1st and 2nd pilots are maintained at −10 and −13 dB, respectively.

It can be observed that as the 3rd and 4th pilot powers are reduced, the performance of the non-legacy UE degrades due to bad channel estimation for CQI and data demodulation. The degradation is severe at a high C/I, e.g. at 20 dB (3c; 4c). This is because at high C/I, there is a high probability of rank 3 and rank 4 transmissions and/or high data rates, which require a larger amount of pilot power energy. On the other hand, low data rates and/or rank selections, which occur at low C/I, e.g. at 0-10 dB (3a, 3b; 4a, 4b) can be demodulated with a lower amount of pilot energy, i.e. a higher traffic-to-pilot ratio.

Introduction of additional pilot signals, when any 4-branch MIMO user equipment is scheduled, may cost some additional overhead and may not give benefit for all the scenarios. In reality, a high amount of pilot signal power is required when the UE is attempting to demodulate high data rates with high rank.

B. Common Pilots for CSI Estimation and Additional Pilots for Data Demodulation

FIG. 5 shows a schematic block diagram illustrating an example of a telecommunications system or system scheme with common pilots and additional scheduled/demodulation pilots.

Similar to the common pilot signal scheme as shown in FIG. 1, the network node transmitter, Tx 151, may transmit known pilot symbols, i.e. common pilots 153 (e.g. CPICH), for channel estimation for channel sounding. Data 154 is precoded, e.g. via precoder 155, and then transmitted together with the common pilots 153. The transmitted data 154 and common pilot signals 153 are received by the user equipment receiver, Rx 152.

The transmitted data 154 is detected by the user equipment, e.g. via a data detector 156. The user equipment may also estimate channel quality, typically SINR, from the channel sounding, e.g. via a channel estimator 157. The user equipment may also compute the preferred precoding matrix and CQI for the next downlink transmission, e.g. via a pre-coder matrix calculator 158. This information may be conveyed to the network node through a feedback channel 159, e.g. HS-DPCCH.

For downlink data transmission, the network node uses this information and chooses the precoding matrix, modulation, coding rate, CQI and the transport block size. The network node may convey this information to the user equipment through a downlink control channel. The network node then transmits data with the modulation and coding rate indicated in the downlink control channel. The network node may pre-multiply the data by a precoding vector/matrix selected by the network node before passing the data to the antenna ports.

In addition to the data 154, additional pilot signals 160 similar to common pilot signals 153 without precoding are transmitted with high power from all or few subset of antennas, e.g. for the $3^{rd}$ and $4^{th}$ antennas. These additional pilots 160 may be referred to as scheduled pilot signals or demodulation pilot signals. The user equipment may estimate the channel for the data demodulation from the demodulation pilot signals or the common pilot symbols.

SUMMARY

It is an object of embodiments herein to improve system performance in a multi-antenna wireless communications system.

According to a first aspect of embodiments herein, the object is achieved by a method performed by a first device for estimating a radio channel between the first device and a second device in a telecommunications system. The first device receives common pilot signals and demodulation signals over the radio channel in transmissions from the second device. Then, the first device estimates the radio channel based on the common pilot signals and the demodulation pilot signals, and determines the radio channel based on the common pilot signals and the demodulation pilot signals.

According to a second aspect of embodiments herein, the object is achieved by a first device for estimating a radio channel between the first device and a second device in a telecommunications system. The first device comprises processing circuitry. The processing circuitry is configured to receive common pilot signals and demodulation signals over the radio channel in transmissions from the second device. The processing circuitry is further configured to estimate the radio channel based on the common pilot signals and the demodulation pilot signals, and determine the radio channel based on the common pilot signals and the demodulation pilot signals.

Above, a technique for channel estimation which utilizes the information from common pilots, as well as, demodulation pilots is described. This improves the channel estimation accuracy, which in turn provides an improved performance in terms of throughput. Hence, the system performance in a multi-antenna wireless communications system is improved.

BRIEF DESCRIPTION OF THE DRAWINGS

The above and other features and advantages of the embodiments will become readily apparent to those skilled in the art by the following detailed description of exemplary embodiments thereof with reference to the accompanying drawings, wherein:

FIG. 11 is a schematic block diagram of embodiments of a network node, FIG. 12 is a schematic block diagram of embodiments of a user equipment.

DETAILED DESCRIPTION

Figure 1:
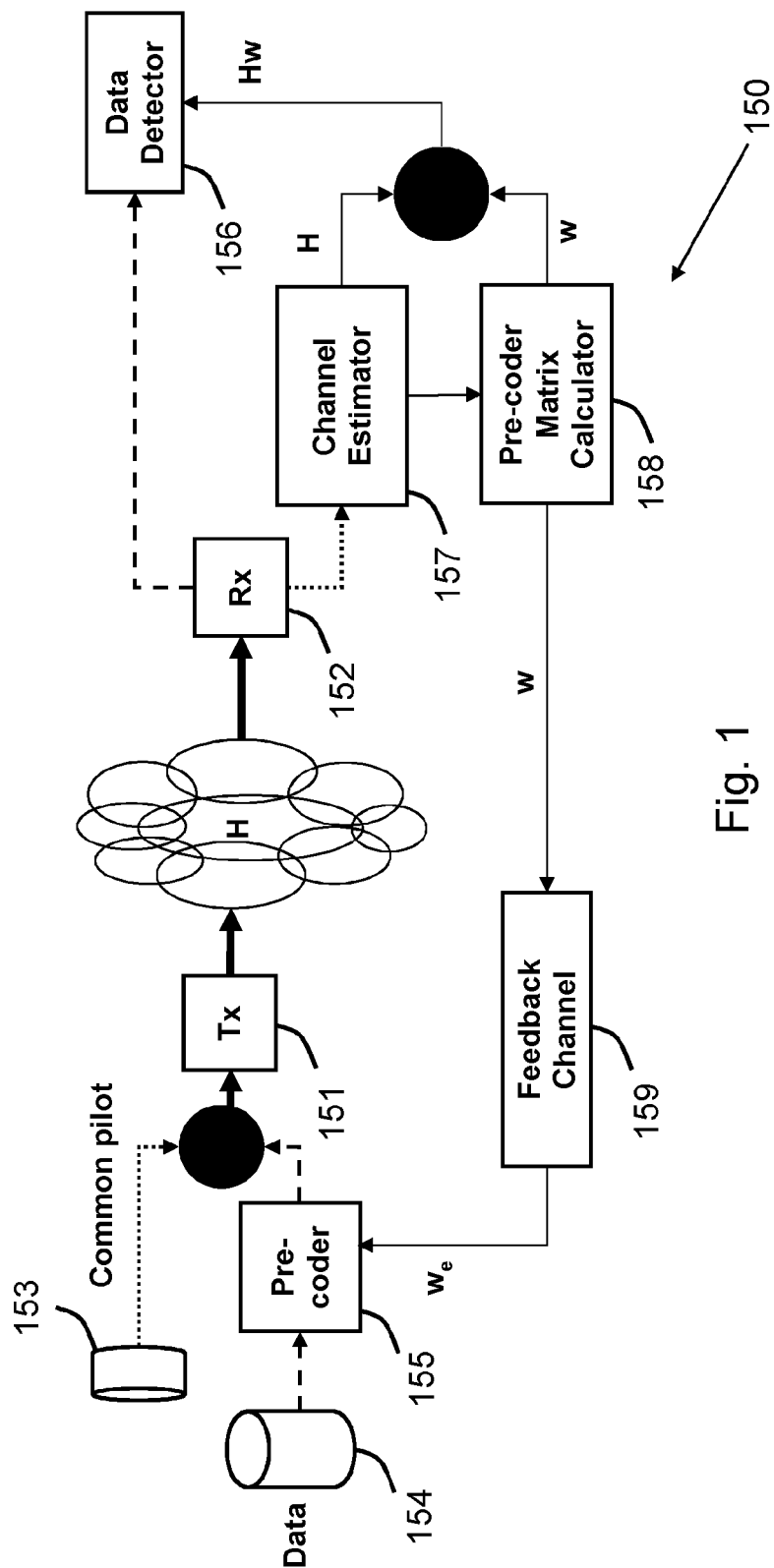
FIG. 1 is a schematic block diagram illustrating an example of a telecommunications system with common pilots for CSI estimation and data demodulation.
Figure 2:
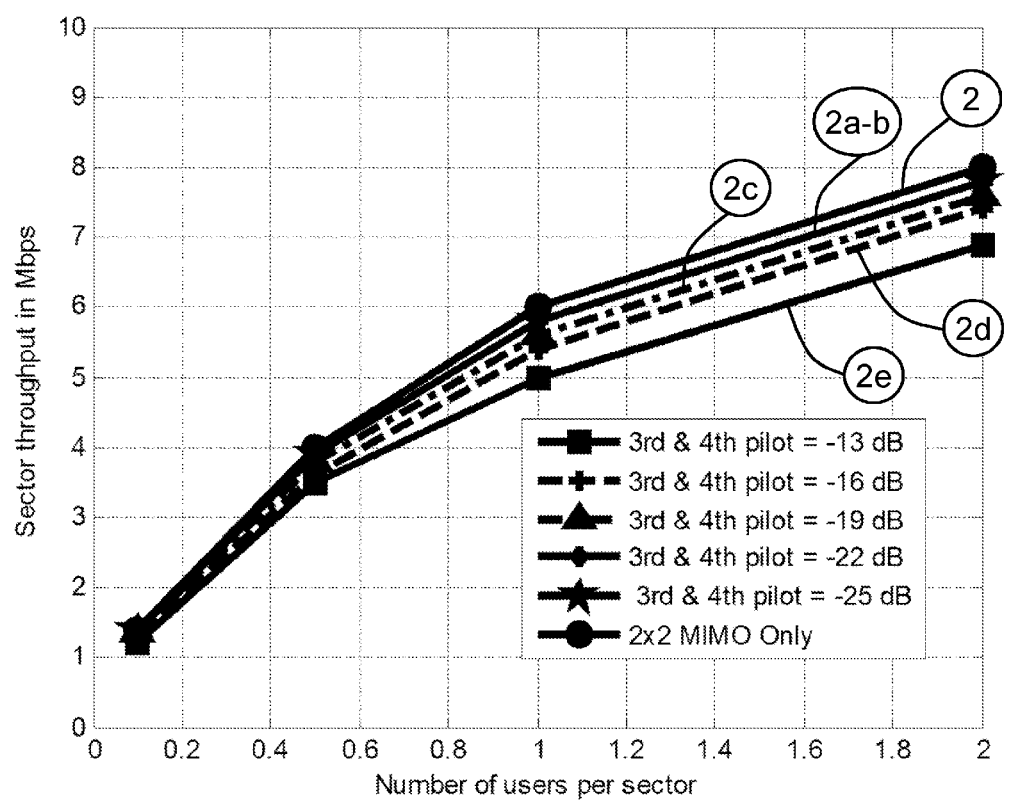
FIG. 2 is a diagram illustrating system throughput with different pilot powers in a telecommunication system.
Figure 3:
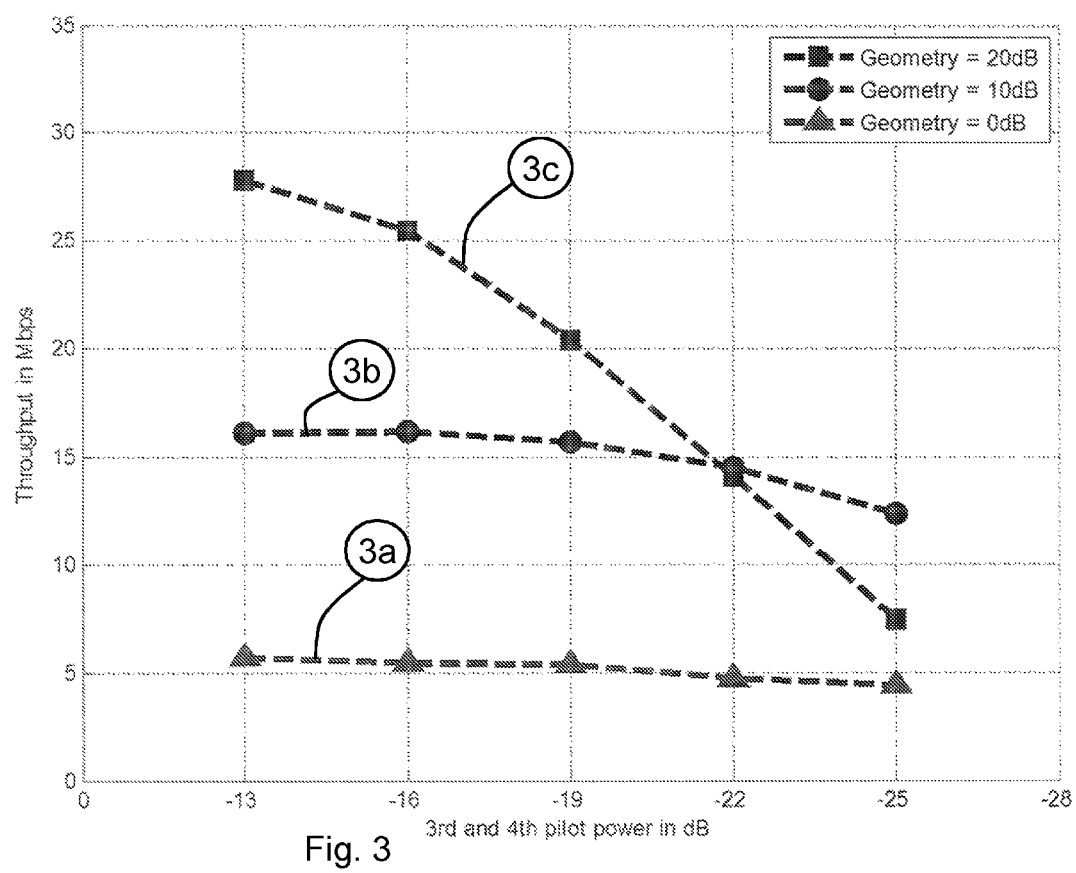
FIG. 3 is a diagram illustrating link level performance when common pilots are used for CSI estimation and data demodulation in a telecommunication system.
Figure 4:
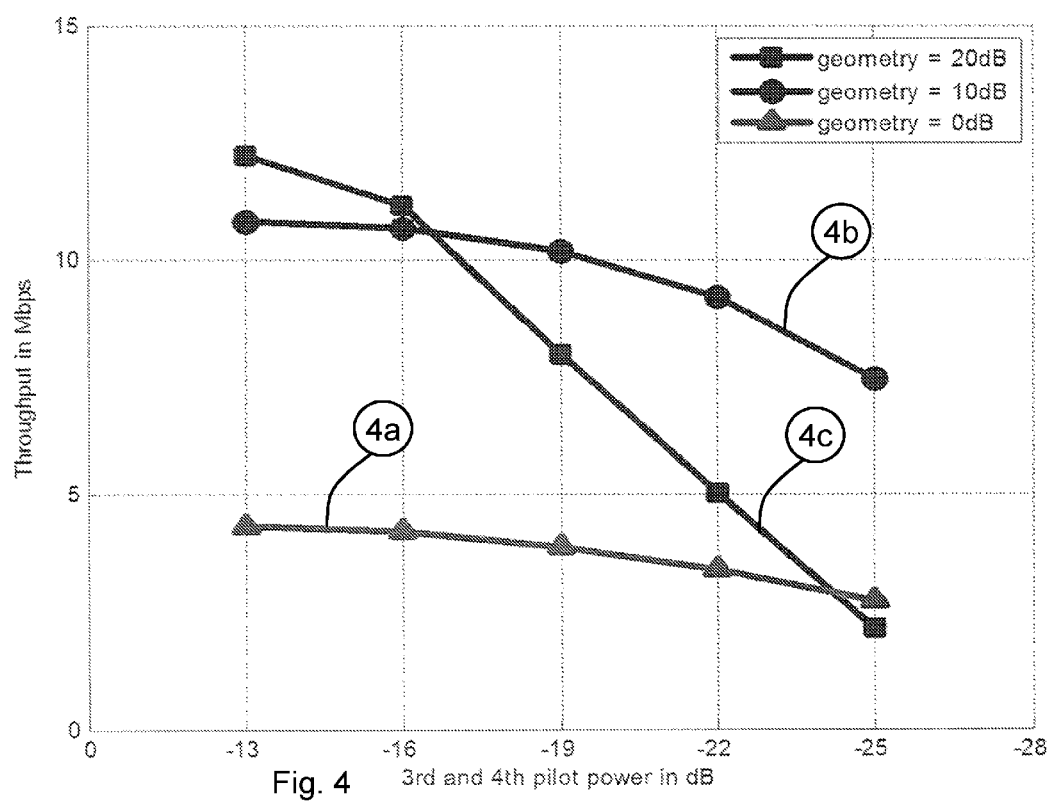
FIG. 4 is a further diagram illustrating link level performance when common pilots are used for CSI estimation and data demodulation in a telecommunication system.
Figure 5:
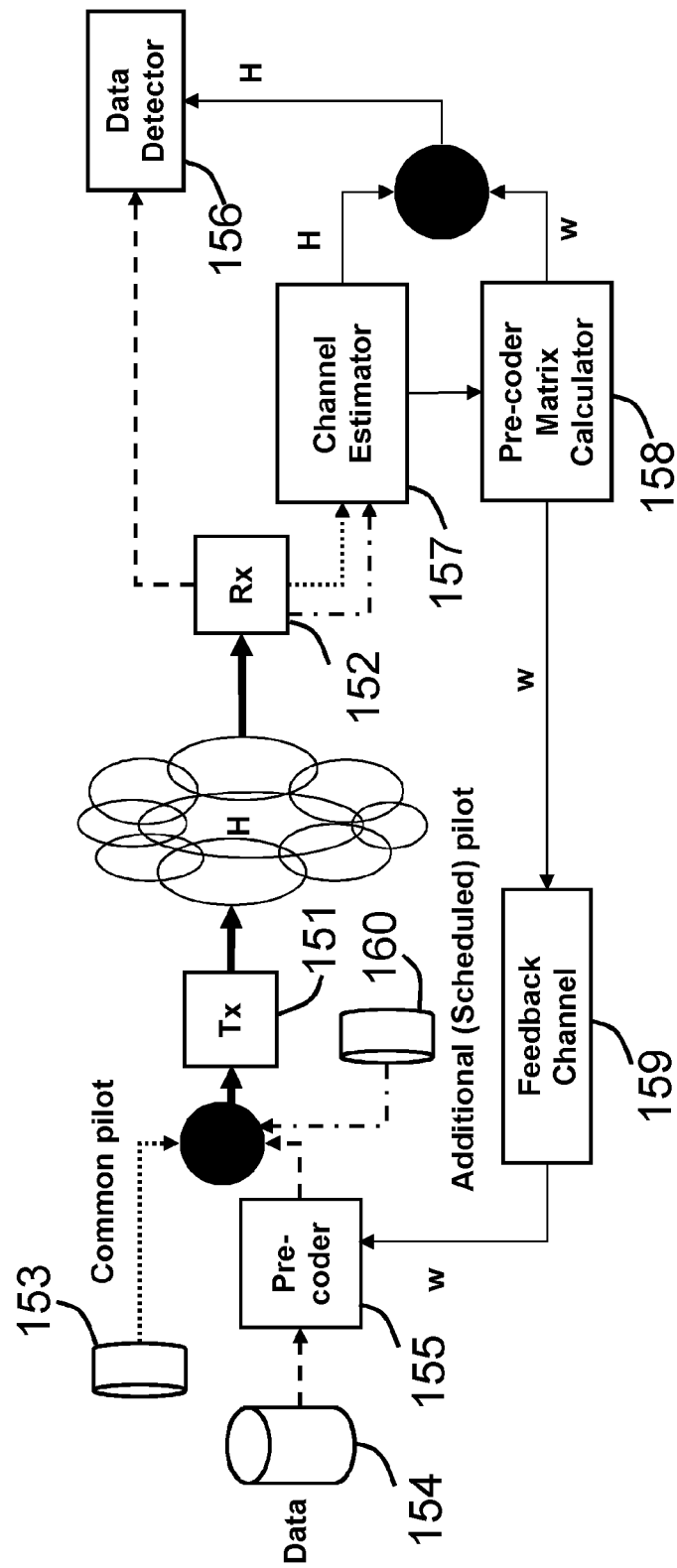
FIG. 5 is a schematic block diagram illustrating an example of a telecommunications system with common pilots and scheduled/demodulation pilots.

The figures are schematic and simplified for clarity, and they merely show details which are essential to the understanding of the embodiments, while other details have been left out. Throughout, the same reference numerals are used for identical or corresponding parts or steps.

It should be noted that terminology from 3GPP HSDPA is predominately used herein to exemplify the embodiments. However, this should not be construed as limiting to the scope of the embodiments to only 3GPP HSDPA. Other wireless systems, including LTE, LTE-Advanced (LTE-A), WiMax, UMB and GSM may also benefit from exploiting the ideas covered by the embodiments herein.

It should also be noted that terminology, such as, e.g. network node (eNodeB, eNode-B, NodeB) and user equipment (UE) should not be considered limiting and does not, in particular, imply a certain hierarchical relation between the network node and the user equipment. In fact, a network node may be considered as a first device, e.g. Device 1, and the user equipment (UE) as a second device, e.g. Device 2, or vice versa. These two devices may communicate with each other over some radio channel. This means that the embodiments described herein may be equally applicable to both a network node and a user equipment.

It should further be noted that, although the description hereinafter is mainly focused on the wireless transmissions in downlink (DL) transmissions, i.e. transmissions from the network node to the user equipment, the embodiments herein are equally applicable in uplink (UL) transmissions, i.e. transmissions from the user equipment to the network node.

Figure 6:
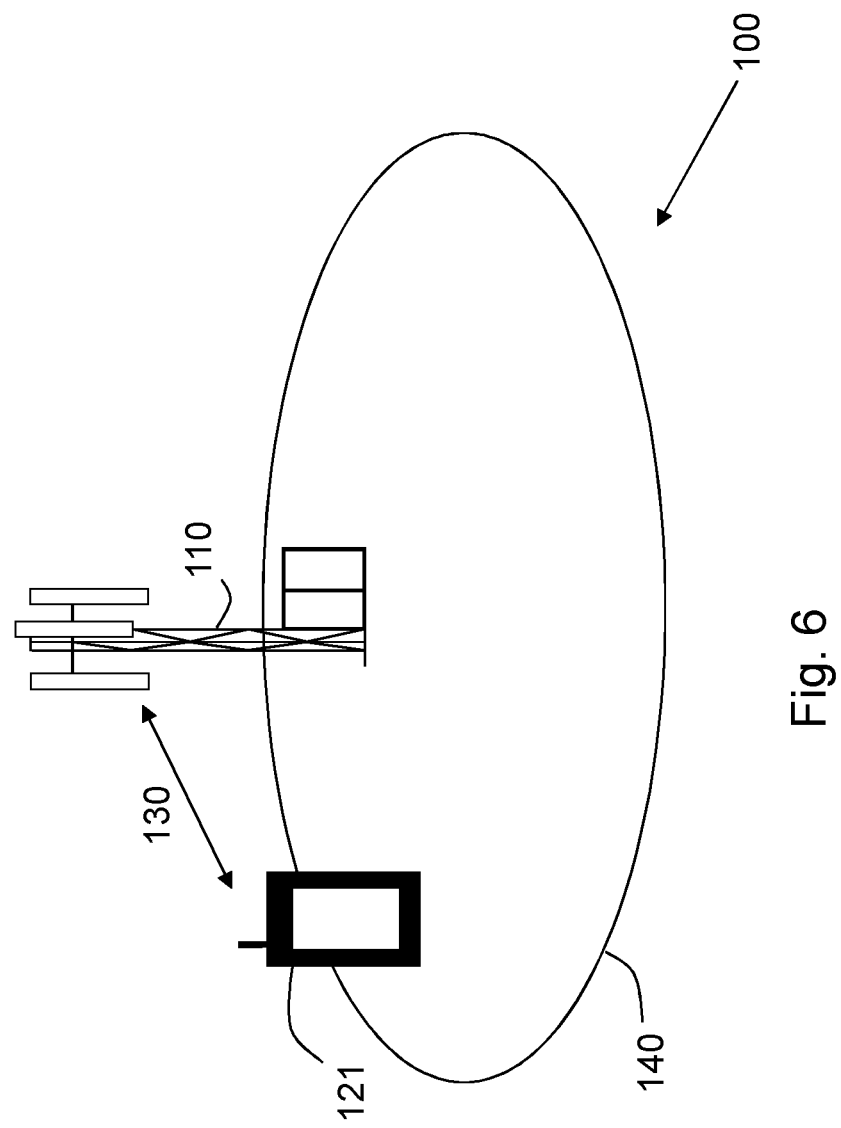
FIG. 6 is a schematic block diagram illustrating embodiments in a telecommunications system.

FIG. 6 depicts a telecommunications system 100 in which embodiments herein may be implemented. The cellular communications system 100 is a wireless communication network such as an HSDPA, LTE, LTE-A, WiMax, WCDMA, UMB or GSM network, any 3GPP cellular network, or any cellular network or system.

The telecommunications system 100 comprises a base station, which is a network node and is therefore referred to herein as the network node 110. The network node 110 may in this example e.g. be an eNB, eNodeB, or a Home Node B, a Home eNode B, femto Base Station (BS), pico BS or any other network unit capable to serve a user equipment or a machine type communication device, such as e.g. the user equipment 121.

The user equipment 121 is configured to communicate within the telecommunications system 102 via the network node 110 over a radio link 130 when served by the network node 110. The user equipment 121 may, for example, be a mobile terminal or a wireless terminal, a mobile phone, a computer such as for example a laptop, a Personal Digital Assistant (PDA) or a tablet computer with wireless capability, a device equipped with a wireless interface, such as a printer or a file storage device or any other radio network unit capable of communicating over a radio link in a telecommunications system.

As part of the developing of the embodiments described herein, a problem will first be identified and discussed.

Figure 7:
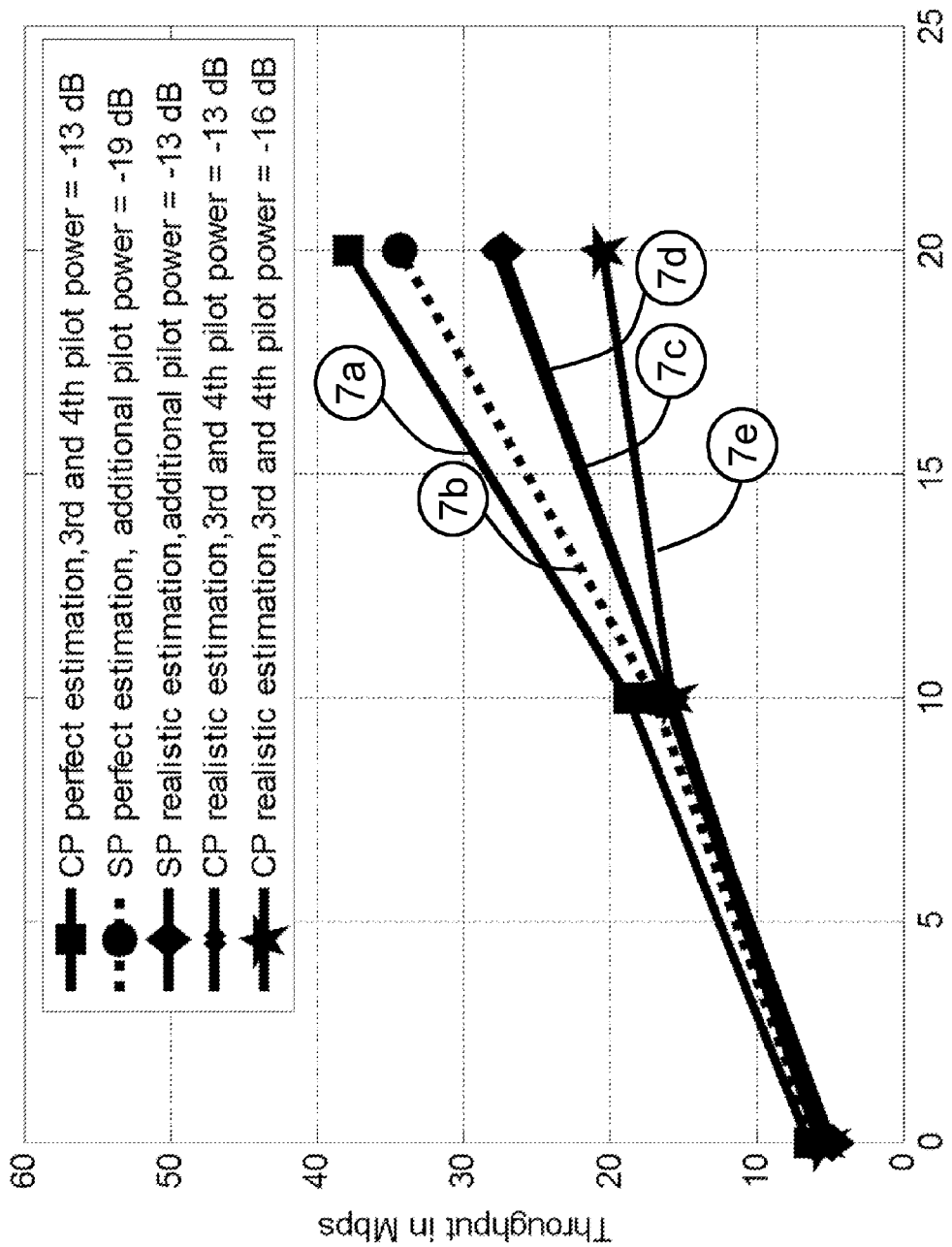
FIG. 7 is a diagram illustrating link level performance when common pilots are used for CSI estimation and scheduled/demodulation pilots are used for data demodulation in a telecommunication system.

FIG. 7 shows a diagram illustrating link level performance when common pilots are used for CSI estimation and scheduled/demodulation pilots are used for data demodulation in a telecommunication system. In other words, the figure shows link performance for a solution based on common pilots for CSI estimation and scheduled pilots for data demodulation.

Note that with an ideal channel estimation, the performance of scheduled/demodulation pilot solution (7b) is always inferior to the common pilot solution (7a). This is due to the additional power allocated to these scheduled/demodulation pilots. This is exemplified in FIG. 6 with a power level of −13 dB on the third ($3^{rd}$) and fourth ($4^{th}$) antennas.

It may also be observed in FIG. 7 that the performance of scheduled/demodulation pilot signals with realistic estimation (7c) is close to that of the common pilot signal solution with realistic estimation (7d) at a pilot signal power of −13 dB. Hence, the scheduled/demodulation pilot signals solution (7d) may be considered attractive in terms of link performance for a 4-branch MIMO system. It may also be observed that the performance gains with scheduled/demodulation pilot signals are almost negligible at low to medium geometries, which may indicate that not all geometries may need scheduled/demodulation pilot signals.

From FIG. 7, it can be observed that for low to medium geometries/data rates, the common pilot signal solution is sufficient to give a reasonable performance in terms of throughput. Hence, additional pilot signals may only be needed at high SNR or for high data rate applications.

Figure 8:
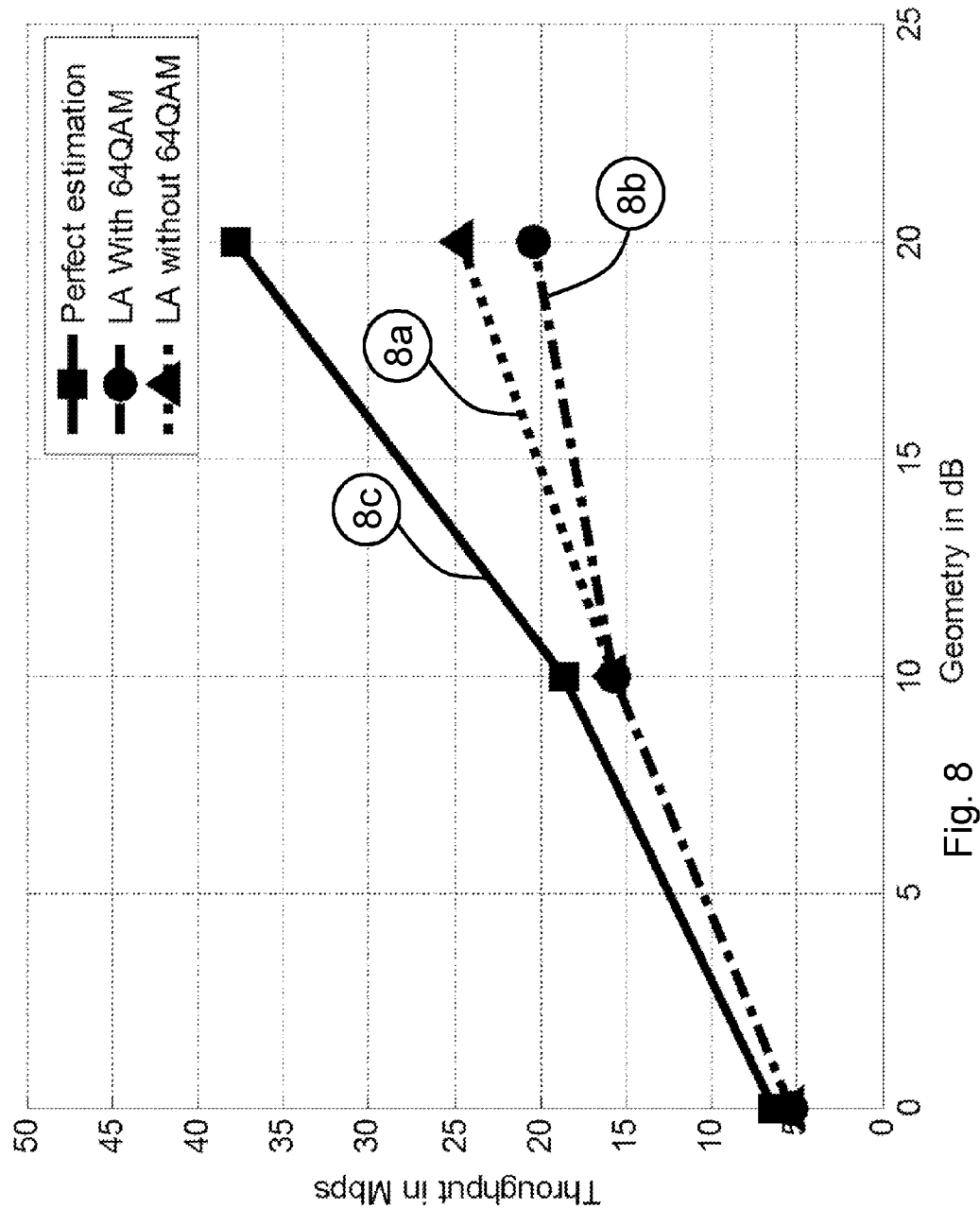
FIG. 8 is a diagram illustrating link level performance when common pilots are used for CSI estimation and data demodulation with two different link adaptation algorithms in a telecommunication system.

In order to show the impact of reduced pilot signal power for high data rate application, FIG. 8 shows a diagram illustrating link level performance when common pilot signals are used for CSI estimation and data demodulation with two different link adaptation algorithms in a telecommunication system. Here, the performance of a 4×4 MIMO link with pilot signal powers [−10 −13 −19 −19] dB for the $1^{st}$ to $4^{th}$ antennas with two different Link Adaptation (LA) algorithms is shown. In the first link adaptation algorithm (8a) all modulations are considered (i.e. QPSK, 16 QAM and 64 QAM), while in the second link adaptation algorithm (8b), only QPSK and 16 QAM is considered.

FIG. 8 shows the performance using the first and second link adaptation algorithms. The results with perfection estimation (8c) are also shown.

It may also be observed that at low and medium geometries, the performance of the first and second link adaptation algorithm is the same. However, at high geometries, the performance of the second link adaptation algorithm (i.e. without 64 QAM) performs better. It may further be seen that the performance degradation with conventional LA is around 33%, while with the modified LA is around 16% compared to the perfect estimation.

According to the simulation results presented and the above discussion, common pilot signals are transmitted for CSI estimation and additional pilot signals for data demodulation may be determined by the network node 110 based on user information available at the network node 110.

Example of user information is CSI reports (e.g. CQI, PCI, RI, etc.), user signal quality in general, data rate, service type (e.g. whether requires higher data rate or not), geometry (e.g. ratio of received power from own cell to that from neighbouring cells), etc. The signal quality may be expressed in terms of e.g. CQI, SINR, SNR, BLER, BER, ACK/NACK for downlink signal reception, CPICH measurements (CPICH RSCP, CPICH Ec/No), etc. For example, when the user equipments are nearer to the cell center (high geometries, hence, higher order modulations) additional pilot signals may be transmitted for data demodulation. Otherwise, common pilot signals may be sufficient for data demodulation.

Figure 9:
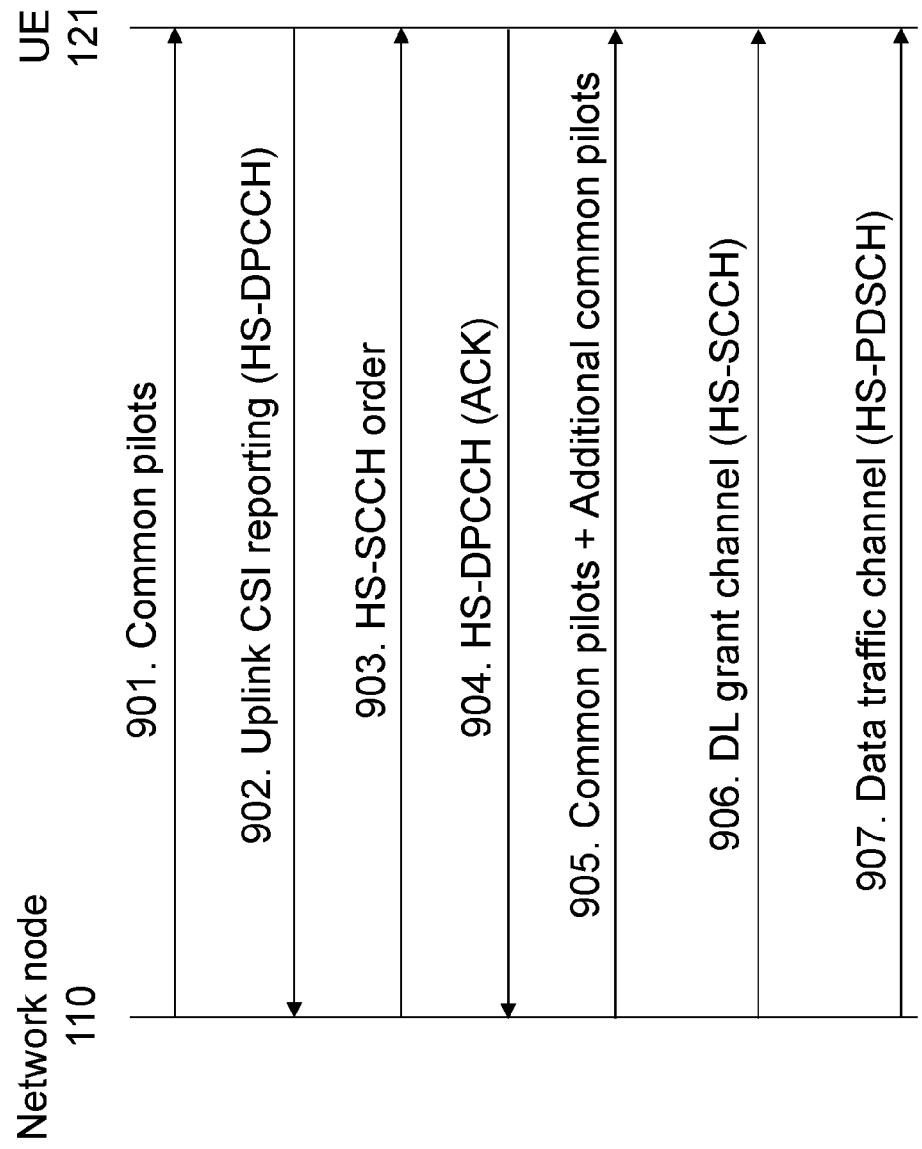
FIG. 9 is a signalling diagram illustrating a message sequence for conveying demodulation pilot information in a telecommunication system.

The embodiments described herein may be explained using the signalling diagram or message sequence chart as shown in FIG. 9.

Action 901

In this action, common pilot signals are transmitted continuously from the network node 110 for CSI estimation at the user equipment 121.

Action 902

Through these channels, the user equipment 121 may compute CSI, such as, channel quality information (CQI), Precoding control index (PCI) and Rank information (RI). The user equipment 121 may then report this information in uplink feedback channel, i.e. uplink CSI reporting, e.g. HS-DPCCH. HS-DPCCH is the High Speed-Dedicated Physical Control CHannel.

Action 903

Upon receiving this information, the network node 110 (via e.g. a scheduler) may determine whether common pilot signals are needed or whether scheduled/demodulation pilot signals are needed for demodulation. This may be performed by the network node 110 based on the signal-to-noise (SNR) ratio, the user location, the modulation and the code rate assigned, etc. In case the scheduled/demodulation pilots are needed to be transmitted, the network node 110 may convey this information through separate signalling using HS-SCCH orders, i.e. special bit pattern for switching on demodulation pilots. HS-SCCH is the High Speed-Shared Control CHannel.

Action 904

If the user equipment 121 is able to decode this message, the user equipment 121 may e.g. send an ACK to this order through the feedback channel, e.g. HS-DPCCH.

Action 905-907

The network node 110 may then transmit the data to the user equipment 121 on HS-PDSCH using common pilot signals and scheduled/demodulation pilot signals. The user equipment 121 may use the scheduled/demodulation pilot signals for demodulation, e.g. on the HS-PDSCH in Actions 906-907. This may be performed e.g. until informed by the network node 110 to use the common pilot signals.

In any wireless telecommunications system, such as, the telecommunications system 100, estimating the radio channel is necessary to calculate the channel state information, CSI, and perform data demodulation at the receiver end, i.e. either at the network node 110 side or at the user equipment 121 side.

With the introduction of 4-branch MIMO in a telecommunication system, new common pilot signals for estimating CSI and new demodulation pilot signals for data demodulation are required.

For the CSI estimation, it was decided in 3GPP that two additional common pilot signals are to be introduced for CSI estimation. For the data demodulation, it was decided in 3GPP that two additional demodulation pilot signals (e.g. D-CPICH) should be used. These may also be referred to as scheduled pilot signals.

It was also decided that the network node should inform the user equipment about these demodulation pilot signals through HS-SCCH orders. Hence, when these additional demodulation pilot signals are configured and enabled by the network node, the user equipment may utilize this information for CSI estimation and for data demodulation.

It should be noted that existing solutions make use of either common pilot signals or demodulation pilot signals for estimating the radio channel, i.e. for channel estimation purposes, and hence the achievable throughput in the telecommunications system is affected by a high channel estimation error.

Thus, using the common pilot signals, only channel estimations with high estimation errors is achievable and available for the CSI estimation and data demodulation. In general, the variance of the channel estimation error, i.e. performance of the estimator or estimating unit in estimating the radio channel, depends on the number of known symbols used for the common pilot signals for estimation, common pilot symbol power, etc.

For a proper explanation of the embodiments herein, a conventional channel estimation method using only common pilot signals is first described below.

Let the channel response between the transmitting antenna and the receiving antenna, i.e. the antenna of the network node 110 and the antenna of the user equipment 121 or vice versa, be represented by the channel impulse response g(t) given by Eq. 1:

$$g(t) = \sum_{l=1}^{L} g_l \delta(t - \tau_l) \quad \text{(Eq. 1)}$$

where L is the number of multi-paths (i.e. the number of transmission paths between the antennas of the network node and the user equipment), $g_l$ and $\tau_l$ are the channel coefficient (i.e. g indicate the amplitude and phase, and τ indicates the delay between the paths) and delay for the l:th path (or tap), respectively. The vector in Eq. 2:

$$g=[g_1 \ldots g_L]^T \quad \text{(Eq. 2)}$$

is often referred to as the medium channel response.

Let the received despread symbols at time k be written as in Eq. 3:

$$y(k)=hs(k)+u(k) \quad \text{(Eq. 3)}$$

where y(k) is a vector with despread data on each antenna finger (or path delay), h is a vector with the net channel responses for each finger, s(k) the transmitted scalar symbol and u(k) a vector representing impairments, i.e. noise and interference, on each finger.

The channel model described above is usually referred to as the "block fading model". This is because the channel is assumed to be stationary over a "block" of consecutive symbols. The symbol s(k) is normalized so that the average power is equal to one. This means that the signal level of the transmitted signal is comprised in the net channel response. The noise and interference term u(k) comprises effects of receiver pulse shape filtering and spreading sequence and the net channel response comprises both the medium channel response g and the pulse shape filtering (both transmitter and receiver, i.e. network node and user equipment or vice versa).

In theory, the net channel response h may be related to the medium channel response g via the following Eq. 4

$$h=Bg \quad \text{(Eq. 4)}$$

where the (k,l):th element of the matrix B is given by the auto-covariance (or autocorrelation) function of the pulse shaping filter (more precisely the convolution of the receiver filter and the transmitter filter) at lag $d_k-\tau_l$, where $d_k$ is the k:th finger delay and $\tau_l$ is the l:th channel tap delay.

Note that, in general, the B matrix is non-invertible since the number of fingers (dimension of h) is usually larger than the number of channel taps (dimension of g).

Note also that in the model in Eq. 4, the symbol energy is included in g. By using the relation in Eq. 4, the channel model in Eq. 3 may be rewritten as Eq. 5:

$$y(k)=Bgs(k)+u(k). \quad (Eq. 5)$$

The channel response is estimated over several symbols in time, typically one slot.

Assuming that there is no correlation between different symbols, then by stacking the outputs $y_k$, the channel or transmission model in Eq. 3 may be written as Eq. 6:

$$\begin{bmatrix} y_1 \\ \vdots \\ y_N \end{bmatrix} = \begin{bmatrix} s_1 I \\ \vdots \\ s_N I \end{bmatrix} h + \begin{bmatrix} u_1 \\ \vdots \\ u_N \end{bmatrix}, \overline{R_u} = \operatorname{cov}\begin{bmatrix} u_1 \\ \vdots \\ u_N \end{bmatrix} = \begin{bmatrix} R_u & \\ & \ddots \\ & & R_u \end{bmatrix} \quad (Eq. 6)$$

where $$R_h = E\{hh^H\}$$

$$R_u = E\{uu^H\}$$

$$R_{hu} = E\{hu^H\}$$

Here, it may be assumed that the transmitted symbols are known (i.e. the pilot signal symbols) and that the estimation is done over a slot (i.e. slot based estimates). For the downlink, DL, the main source of pilot signal symbols is the CPICH providing N=10 symbols per slot.

The least squares estimate of h given the model structure in Eq. 3 may be obtained as shown in Eq. 7:

$$\hat{h}_{LS} = \frac{1}{N}\sum_{k=0}^{N-1} s_k^* y_k \quad (Eq. 7)$$

Note that there are other methods of estimating h, such as Maximum Likelihood, MMSE etc. For all these estimation techniques, $h_{LS}$ is considered the most basic as it is simple to implement.

Hence, $h_{LS}$ is considered in the embodiments described herein.

In the embodiments described in the following and herein, methods and apparatuses, i.e. a network node and a user equipment, which utilizes the information from common pilot signals as well as demodulation pilot signals for estimating the radio channel, i.e. for channel estimation, are described. This means that both the common pilot signals, i.e. both legacy common pilot signals and additional common pilot signals, and the demodulation pilot signals, i.e. both legacy demodulation pilot signals and additional demodulation pilot signals, are used in the channel estimation. In other words, the information from both the common pilot signals with low power and the demodulation pilot signals with high power are used are used in the channel estimation. The common pilot signals and the demodulation pilot signals may also be referred to as hybrid pilots or pilot signals or mixed pilot or pilot signals.

This improves the performance of the estimation of the radio channel and enhances the channel estimation accuracy.

By improving the estimation of the radio channel, the performance in terms of throughput in the telecommunications system is improved.

Figure 10:
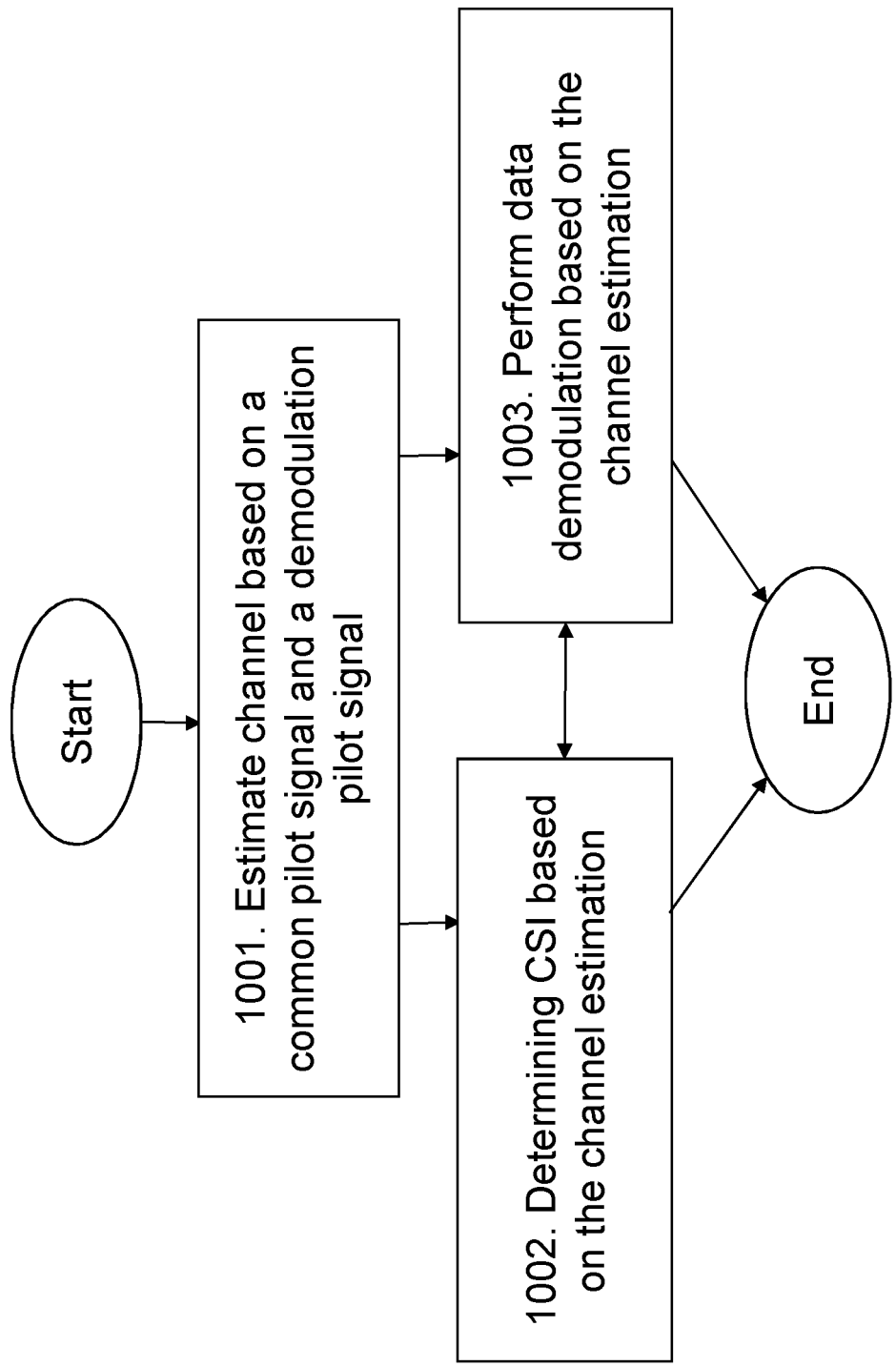
FIG. 10 is a flow chart depicting embodiments of a method for channel estimation.

Example of embodiments of a method in a first device for estimating a radio channel between the first device and a second device in a wireless telecommunications network 100, will now be described with reference to a flowchart depicted in FIG. 10.

Furthermore, the method may be performed by the first device for downlink MIMO transmissions to the second device, i.e. the first device may be a user equipment 121 and the second device may be a network node 110 in the downlink transmissions.

However, in the following, the method is discussed seen from the perspective of the first device being the user equipment 121 and the second device being the network node 110, i.e. for downlink MIMO transmissions.

Here, the network node 110 may transmit common pilot signals and demodulation signals over the radio channel to the user equipment 121. Also, the user equipment 121 may receive the common pilot signals and demodulation signals over the radio channel from the network node 110.

The method may comprise the following actions, which actions may be taken in any suitable order.

Action 1001

In this action, the user equipment 121 estimates the radio channel based on the common pilot signal and the demodulation pilot signal.

In some embodiments, when estimating the radio channel, the user equipment 121 may further perform a first estimation of the radio channel based on the common pilot signal, perform a second estimation of the radio channel based on the demodulation pilot signal and estimate the radio channel based on the first and second estimation of the radio channel.

In some embodiments, when estimating the radio channel based on the first and second individual channel estimation of the radio channel, the user equipment 121 may use a weighted sum of the individual channel estimates of the first and second estimations, i.e. a weighted sum of the common pilot signals and demodulation pilot signals.

In some embodiments, the weighted sum of individual channel estimates of the first and second estimation may be defined as:

$$h_{LS}=w_1 * h_{LS\_C} + w_2 * h_{LS\_D} * \eta,$$

wherein hLS_C is the channel estimate based on a common pilot signal, hLS_D is the channel estimate based on a demodulation pilot signal, and w1 and w2 are weight factors. Note $\eta$ is here an optional additional factor, and may be comprised or not comprised in the definition of the channel estimation above.

In some embodiments, the weight factors w1, w2 in the weighted sum $h_{LS}$ of individual channel estimates of the first and second estimation may be based on the power levels of the common pilot signals and the demodulation pilot signals, respectively. In other words, the weight factors or weighting factors w1, w2 may depends on the power levels of the individual pilot signals, i.e. consider $\gamma$ as the power level of the common pilot signal and $\mu$ the power level of the demodulation pilot signal.

According to one example, the weight factor w1, w2 may be determined as: $w1=\frac{1}{2}\sqrt{\gamma}$ and $w2=\frac{1}{2}\sqrt{\mu}$.

In some embodiments, the additional factor q may be used by the user equipment 121 in order to take into account the presence or absence of demodulation pilot signals in a dynamic way.

In some embodiments, the additional factor η=0, when no HS-SCCH order was received in the user equipment 121 for enabling demodulation pilot signals. In this case, the additional factor η=1, when the user equipment 121 sends an ACK to the network node 110 for the HS-SCCH order for enabling demodulation pilot signals.

In some embodiments, an additional condition may be a trigger or indicator in the user equipment 121 of when to use the demodulation pilot signals in the estimation of the radio channel. In some embodiments, the additional factor η=0, when no HS-SCCH order was received in the user equipment 121 for enabling demodulation pilot signals. In this case, the additional factor η=1, when the user equipment 121 sends an ACK to the network node 110 for the HS-SCCH order for enabling demodulation pilot signals and when an additional condition is respected, i.e. fulfilled. Also, in this case, the additional factor η=0, when the user equipment 121 sends an ACK to the network node 110 for the HS-SCCH order for enabling demodulation pilot signals and when the additional condition is not respected, i.e. not fulfilled.

In some embodiments, the additional condition may be a power level condition. In some embodiments, the additional condition may be a target accuracy level for the channel estimation, i.e. a target accuracy level that should be achieved in the channel estimation.

In some embodiments, the additional factor may be n=α, wherein 0≤α≤1. Here, α may depend on the power level of the demodulation pilot signal and their associated reliability.

Furthermore, to describe the estimation performed in the user equipment 121 in this Action, a similar channel or transmission model as the channel or transmission model in Eq. 6 after dispreading as previously used above may be repeated here as shown by Eq. 8-9:

$$y_A = \begin{bmatrix} c_1 I \\ \vdots \\ c_N I \end{bmatrix} h + u_A \quad \text{(Eq. 8)}$$

$$y_B = \begin{bmatrix} d_1 I \\ \vdots \\ d_N I \end{bmatrix} h + u_B \quad \text{(Eq. 9)}$$

where $c_k$ is the common pilot signal at symbol k, $d_k$ is the dedicated pilot signal at symbol k, and h is the wanted channel parameter. Here, $u_A$ is the noise component after dispreading the transmitted signal with a common pilot spreading sequence, and $u_B$ is the noise component after dispreading the transmitted signal with demodulation pilot spreading sequence.

The total estimated channel may now be expressed as is shown in Eq. 10:

$$\text{Estimated } h = h_{LS\_C}/2\sqrt{\gamma}\_*h_{LS\_D}/2\sqrt{\mu} \quad \text{(Eq. 10)}$$

and mathematically as shown in Eq. 11:

$$\hat{h}_{LS} = \frac{1}{N2\sqrt{\gamma}} \sum_{k=0}^{N-1} s_k^* y_A + \frac{1}{N2\sqrt{\mu}} \sum_{k=0}^{N-1} d_k^* y_B \quad \text{(Eq. 11)}$$

$$= h + \frac{1}{N2\sqrt{\gamma}} \sum_{k=0}^{N-1} s_k^* u_A + \frac{1}{N2\sqrt{\mu}} \sum_{k=0}^{N-1} d_k^* u_B$$

$$= h + n_{JOINT}$$

It should be noticed that in the legacy case, i.e. for 2Tx or less, the estimate of the channel would have been as shown in Eq.12:

$$\hat{h}_{LS} = \frac{1}{N\sqrt{\gamma}} \sum_{k=0}^{N-1} s_k^* y_A \quad \text{(Eq. 12)}$$

$$= h + \frac{1}{N\sqrt{\gamma}} \sum_{k=0}^{N-1} s_k^* u_A = h + n_{COMMON}$$

For some embodiments herein, by comparing the noise variance for the two cases, i.e. common pilot signal case vs. common pilot signal+demodulation pilot signal case, and a formula which may, in some embodiments, be used to trigger the use of the demodulation pilot signals. This formula is explained and presented in more detail below. The formula may also be referred to as a condition or additional condition (as referred to above).

The noise variance or noise distribution for the hybrid or mixed case, i.e. the transmitted signal comprises both common pilot signals and demodulation pilot signals, may be described as shown in Eq. 13:

$$n_{JOINT} \approx N\left(0, \frac{\sigma_A^2}{4N\gamma} + \frac{\sigma_B^2}{4N\mu}\right) \quad \text{(Eq. 13)}$$

while, when using only common pilot signals, the noise may be distributed as shown in Eq. 14:

$$n_{COMMON} \approx N\left(0, \frac{\sigma_A^2}{N\gamma}\right) \quad \text{(Eq. 14)}$$

Hence, the formula, condition or additional condition, may be described as shown in Eq. 15:

$$\frac{\sigma_A^2}{4N\gamma} + \frac{\sigma_B^2}{4N\mu} < \frac{\sigma_A^2}{N\gamma} \Rightarrow \frac{\sigma_B^2}{4N\mu} < \frac{\sigma_A^2}{N\gamma} - \frac{\sigma_A^2}{4N\gamma} \Rightarrow \quad \text{(Eq. 15)}$$

$$\frac{\sigma_B^2}{4N\mu} < \frac{3\sigma_A^2}{4N\gamma} \Rightarrow \sigma_B^2 \gamma < 3\sigma_A^2 \mu$$

According to some embodiments, an estimate of the $\sigma_B^2$ and $\sigma_A^2$ may additionally be obtained as shown in Eq. 16-17:

$$\sigma_A^2 = P\text{data}/SF + \text{Thermal Noise variance}/SF + \mu/SF \quad \text{(Eq. 16)}$$

$$\sigma_B^2 = P\text{data}/SF + \text{Thermal Noise variance}/SF + \gamma/SF \quad \text{(Eq. 17)}$$

where Pdata is the power available for data,
SF is the spreading factor,
Thermal Noise variance is the noise variance or noise power,
γ is the power level of the common pilot signal, and
μ is the power level of the demodulation pilot signal.

Hence, the final formula, condition or additional condition, which may be used by the user equipment 121 to determine whether or not to use the demodulation pilot signal in the channel estimation, may be described as shown in Eq. 18:

$$\sigma_B^2 \gamma < 3\sigma_A^2 \mu \quad \text{(Eq. 18)}$$

In this way, the performance of the estimation of the radio channel may be improved and the channel estimation accuracy be enhanced.

Action 1002

In some embodiments, the user equipment 121 may determine the channel state information, CSI, based on the estimation of the radio channel. By using the estimation of the radio channel as described in Action 1001, a more accurate CSI information may be achieved.

Action 1003

In some embodiments, the user equipment 121 may perform data demodulation based on the estimation of the radio channel. This may be performed by itself or in addition to the CSI determination in Action 1002. By using the estimation of the radio channel as described in Action 1001, a more accurate data demodulation may be achieved.

The example embodiments presented herein may be utilized in a radio network, which may further comprise network nodes, such as, a base station 110, as illustrated in FIG. 11. The radio network may also comprise a user equipment 121, as illustrated in 12. It should be appreciated that the examples provided in FIGS. 11 and 12 are shown merely as non-limiting examples. According to the example embodiments, the network node 110 and user equipment 121 may be any other node as described in the examples provided in the above sections.

As shown in FIG. 11, the example network node 110 may comprise processing circuitry 1103, a memory 1102, radio circuitry 1101, and at least one antenna. The processing circuitry 1103 may comprise RF circuitry and baseband processing circuitry (not shown). In particular embodiments, some or all of the functionality described above as being provided by a mobile base station, a base station controller, a relay node, a NodeB, an enhanced NodeB, positioning node, and/or any other type of mobile communications node may be provided by the processing circuitry 1103 executing instructions stored on a computer-readable medium, such as the memory 1102 shown in FIG. 11. Alternative embodiments of the network node 110 may comprise additional components responsible for providing additional functionality, comprising any of the functionality identified above and/or any functionality necessary to support the solution described above. In other example embodiments, a network node may not be equipped with a radio interface or radio circuitry 1101.

Also, in some embodiments, the network node 110 may be configured to transmit common pilot signals and demodulation signals over the radio channel to the user equipment 121. It should be appreciated that the processing circuitry 1103, or any other hardware and/or software unit configured to execute operations and/or commands, of the network node 110 may be configured to determine when to transmit common pilot signals and demodulation signals over the radio channel to the user equipment 121.

An example of a user equipment 121 is provided in FIG. 12. The example user equipment 121 may comprise processing circuitry 1202, a memory 1203, radio circuitry 1201, and at least one antenna. The radio circuitry 1201 may comprise RF circuitry and baseband processing circuitry (not shown). In particular embodiments, some or all of the functionality described above as being provided by mobile communication devices or other forms of wireless device may be provided by the processing circuitry 1202 executing instructions stored on a computer-readable medium, such as the memory 1203 shown in FIG. 12. Alternative embodiments of the user equipment 121 may comprise additional components responsible for providing additional functionality, comprising any of the functionality identified above and/or any functionality necessary to support the solution described above.

Also, in some embodiments, the user equipment 121 may be configured to receive common pilot signals and demodulation signals over a radio channel from the network node 110, i.e. in downlink MIMO transmissions.

It should be appreciated that the processing circuitry 1202, or any other hardware and/or software unit configured to execute operations and/or commands, of the user equipment 121 may be configured to estimate a radio channel between the user equipment 121 and a network node 110 in a telecommunications system 100.

The processing circuitry 1202 may be configured to estimate the radio channel based on the common pilot signal and the demodulation pilot signal received in the network node 110 from the user equipment 121. Then, the processing circuitry 1202 may be configured to determine CSI information and/or perform data demodulation based on the estimation of the radio channel. Further, more detailed embodiments of the user equipment 121 and operations of the processing circuitry 1202 may be seen in the above described method.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

Although the description is mainly given for a user equipment, as measuring or recording unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

In summary, according to a first aspect of embodiments herein, a method in a first device for estimating a radio channel between the first device and a second device in a telecommunications system is provided. The second device is configured to transmit common pilot signals and demodulation signals over the radio channel to the first device. The first device may receive the common pilot signals and demodulation signals over the radio channel from the second device. Also, the first device may estimate the radio channel based on the common pilot signal and the demodulation pilot signal. Then, the first device may determine channel state information, CSI, and/or perform data demodulation based on the estimation of the radio channel. In some embodiments, this may be performed by the first device for downlink MIMO transmissions to the second device. In some embodiments, the first device may be a user equipment and the second device may be a network node. In some embodiments, when estimating the radio channel the first device may further perform a first estimation of the radio channel based on the common pilot signal, perform a second estimation of the radio channel based on the demodulation pilot signal and estimate the radio channel based on the first and second estimation of the radio channel. In some embodiments, when estimating the radio channel based on the first and second individual channel estimation of the radio channel, the first device may use a weighted sum of the individual channel estimates of the first and second estimations. In some embodiments, the weight factors in the weighted sum of individual channel estimates of the first and second estimation may be based on the power levels of the common pilot signal and the demodulation pilot signal, respectively. In some embodiments, the weighted sum of individual channel estimates of the first and second estimation may be defined as:

$$h_{LS} = w_1 * h_{LS\_C} + w_2 * h_{LS\_D} * \eta,$$

wherein hLS_C is the channel estimate based on a common pilot signal, hLS_D is the channel estimate based on a demodulation pilot signal, and w1 and w2 are weight factors. Note $\eta$ is here an optional additional factor, and may be comprised or not comprised in the definition of the channel estimation above. In some embodiments, the additional factor $\eta$ may be used by the first device in order to take into account the presence or absence of demodulation pilot signals in a dynamic way. In some embodiments, the additional factor $\eta=0$, when no HS-SCCH order was received in the first device for enabling demodulation pilot signals. In this case, the additional factor $\eta=1$, when the first device sends an ACK to the second device for the HS-SCCH order for enabling demodulation pilot signals. In some embodiments, an additional condition may be used a trigger or indicator in the first device of when to use the demodulation pilot signals in the estimation of the radio channel. In some embodiments, the additional factor $\eta=0$, when no HS-SCCH order was received in the first device for enabling demodulation pilot signals. In this case, the additional factor $\eta=1$, when the first device sends an ACK to the second device for the HS-SCCH order for enabling demodulation pilot signals and when an additional condition is respected, i.e. fulfilled. Also, in this case, the additional factor $\eta=0$, when the first device sends an ACK to the second device for the HS-SCCH order for enabling demodulation pilot signals and when the additional condition is not respected, i.e. not fulfilled. In some embodiments, the additional condition may be a power level condition. In some embodiments, the additional condition may be a target accuracy level for the channel estimation. In some embodiments, the additional factor may be $\eta=\alpha$, wherein $0 \leq \alpha \leq 1$. Here, $\alpha$ may depend on the power level of the demodulation pilot signal and their associated reliability.

Modifications and other embodiments of the disclosed embodiment(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

ACK Acknowledgement
BLER BLock Error Rate
CC Chase Combining
CN Core Network
CPICH Common Pilot CHannel
CRC Cyclic Redundancy Check
CSI Channel State Information
CQI Channel Quality Information
DL Downlink HSDPA High Speed Downlink Packet Access
HARQ Hybrid Automatic Repeat reQuest
HS-DPCCH High Speed-Dedicated Physical Control CHannel
HS-PDSCH High-Speed-Physical Downlink Shared CHannel
HS-SCCH High Speed-Shared Control CHannel
IR Incremental Redundancy
LA Link Adaptation
MIMO Multiple Input Multiple Output
MMSE Minimum Mean Square Error
NACK Non-Acknowledgement
PCI Precoding Control Index or Precoding Control Indicator
PMI Precoding Matrix Indicator
QAM Quadrature Amplitude Modulation
QPSK Quadrature Phase Shift Keying
RAN Radio Access Network
RBS Radio Base Station
RSCP Received Signal Code Power
RI Rank information
Rx Receiver
SINR Signal-to-Interference-and-Noise Ratio
SNR Signal-to-Noise Ratio
Tx Transmitter
TTI Transmit Time Interval
UE User Equipment
UL Uplink

The invention claimed is:

1. A method performed by a first device for estimating a radio channel between the first device and a second device in a telecommunications system comprising
receiving, by one or more processors, common pilot signals and demodulation signals over the radio channel in transmissions from the second device;
estimating, by the one or more processors, the radio channel based on the common pilot signals and the demodulation pilot signals, wherein the estimation comprises:
performing a first estimation of the radio channel based on the common pilot signals;
performing a second estimation of the radio channel based on the demodulation pilot signals;
estimating the radio channel based on the first and second estimation of the radio channel, wherein the weight factors of the weighted sum of the first and second radio channel estimations are based on the power levels of the common pilot signal and the demodulation pilot signal, respectively; and
determining, by the one or more processors, the radio channel based on the common pilot signals and the demodulation pilot signals.

2. The method according to claim 1, wherein the weighted sum of the first and second estimations is defined as $$hLS=W1*hLS\_C+W2*hLS\_D,$$

wherein hLS_C is the first radio channel estimation based on a common pilot signal, hLS_D is the second channel estimation based on a demodulation pilot signal, and w1 and w2 are the weight factors of the weighted sum.

3. The method according to claim 1, wherein the weighted sum of the first and second estimations is defined as $$hLS=W1*hLS\_C+W2*hLS\_D*\eta,$$

wherein hLS_C is the first radio channel estimation based on a common pilot signal, hLS_D is the second channel estimation based on a demodulation pilot signal, w1 and w2 are the weight factors of the weighted sum, and $\eta$ is an additional factor value.

4. The method according to claim 3, wherein the additional factor value $\eta$ is based on the presence or absence of the demodulation pilot signals.

5. The method according to claim 4, wherein, when no High Speed-Shared Control CHannel, HS-SCCH, order was received in the first device for enabling demodulation pilot signals, the additional factor value $\eta=0$; and correspondingly, when the first device sends an ACK to the second device for the HS-SCCH order for enabling demodulation pilot signals, the additional factor value $\eta=1$.

6. The method according to claim 3, wherein the additional factor value $\eta$ is based on a target power level or a target accuracy level for the radio channel estimation.

7. The method according to claim 3, wherein the additional factor value $n=\alpha$, wherein $0 \le \alpha \le 1$, which a is based on the power level of the demodulation pilot signals and their associated reliabilities.

8. A first device for estimating a radio channel between the first device and a second device in a telecommunications system, the first device comprising processing circuitry and memory storing instructions configured to receive common pilot signals and demodulation signals over the radio channel in transmissions from the second device, the first device being characterized in that the processing circuitry is further configured to estimate the radio channel based on the common pilot signals and the demodulation pilot signals, and determine the radio channel based on the common pilot signals and the demodulation pilot signals, wherein:
the processing circuitry and memory storing instructions is further configured to:
perform a first estimation of the radio channel based on the common pilot signals,
perform a second estimation of the radio channel based on the demodulation pilot signals, and
estimate the radio channel based on the first and second estimation of the radio channel; and
the weight factors of the weighted sum of the first and second radio channel estimations are based on the power levels of the common pilot signal and the demodulation pilot signal, respectively.

9. The first device according to claim 8, wherein the processing circuitry is configured to perform the estimation using the weighted sum of the first and second estimations defined as $$hLS=W1*hLS\_C+W2*hLS\_D,$$

wherein hLS_C is the first radio channel estimation based on a common pilot signal, hLS_D is the second channel estimation based on a demodulation pilot signal, and w1 and w2 are the weight factors of the weighted sum.

10. The first device according to claim 8, wherein the processing circuitry is configured to perform the estimation using the weighted sum of the first and second estimations defined as $$hLS=W1*hLS\_C+W2*hLS\_D*\eta,$$

wherein hLS_C is the first radio channel estimation based on a common pilot signal, hLS_D is the second channel estimation based on a demodulation pilot signal, w1 and w2 are the weight factors of the weighted sum, and $\eta$ is an additional factor value.

11. The first device according to claim 10, wherein the additional factor value $\eta$ is based on the presence or absence of the demodulation pilot signals.

12. The first device according to claim 11, wherein the processing circuitry is configured to set the additional factor value $\eta=0$ when no High Speed-Shared Control CHannel, HS-SCCH, order was received in the first device for enabling demodulation pilot signals, and correspondingly, set the additional factor value $\eta=1$ when the first device sends an ACK to the second device for the HS-SCCH order for enabling demodulation pilot signals.

13. The first device according to claim 10, wherein the additional factor value $\eta$ is based on a target power level or a target accuracy level for the radio channel estimation.

14. The first device according to claim 10, wherein the additional factor value $n=\alpha$, wherein $0 \leq \alpha \leq 1$, which a is based on the power level of the demodulation pilot signals and their associated reliabilities.

15. The first device according to claim 8, wherein the processing circuitry is configured to perform the estimation for downlink MIMO transmissions from the second device.

16. The first device according claim 8, wherein the first device is a user equipment and the second device is a network node.

* * * * *